Feb. 28, 1939.  M. BAERMANN, JR  2,148,523
APPARATUS FOR WEIGHING
Filed June 5, 1935    4 Sheets-Sheet 1
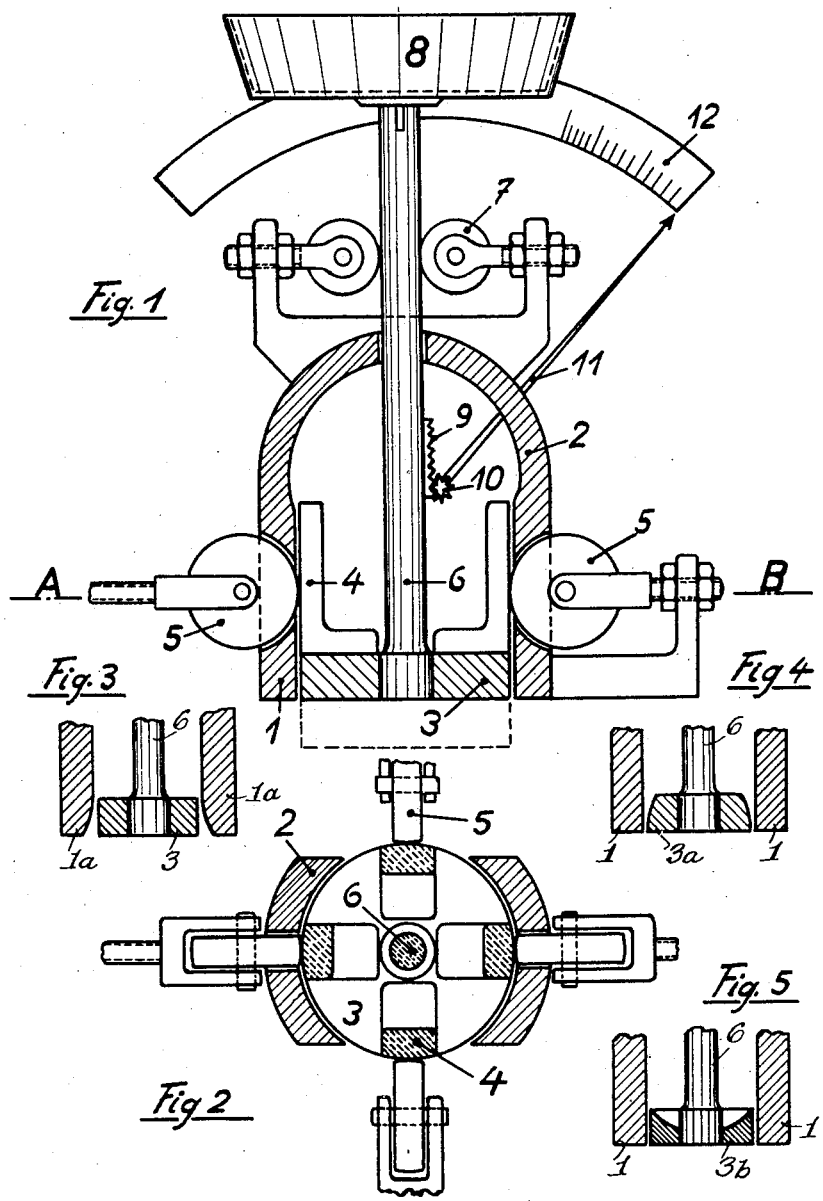
INVENTOR
Max Baermann, jnr.
By Arthur J. Stephens
ATTORNEY.

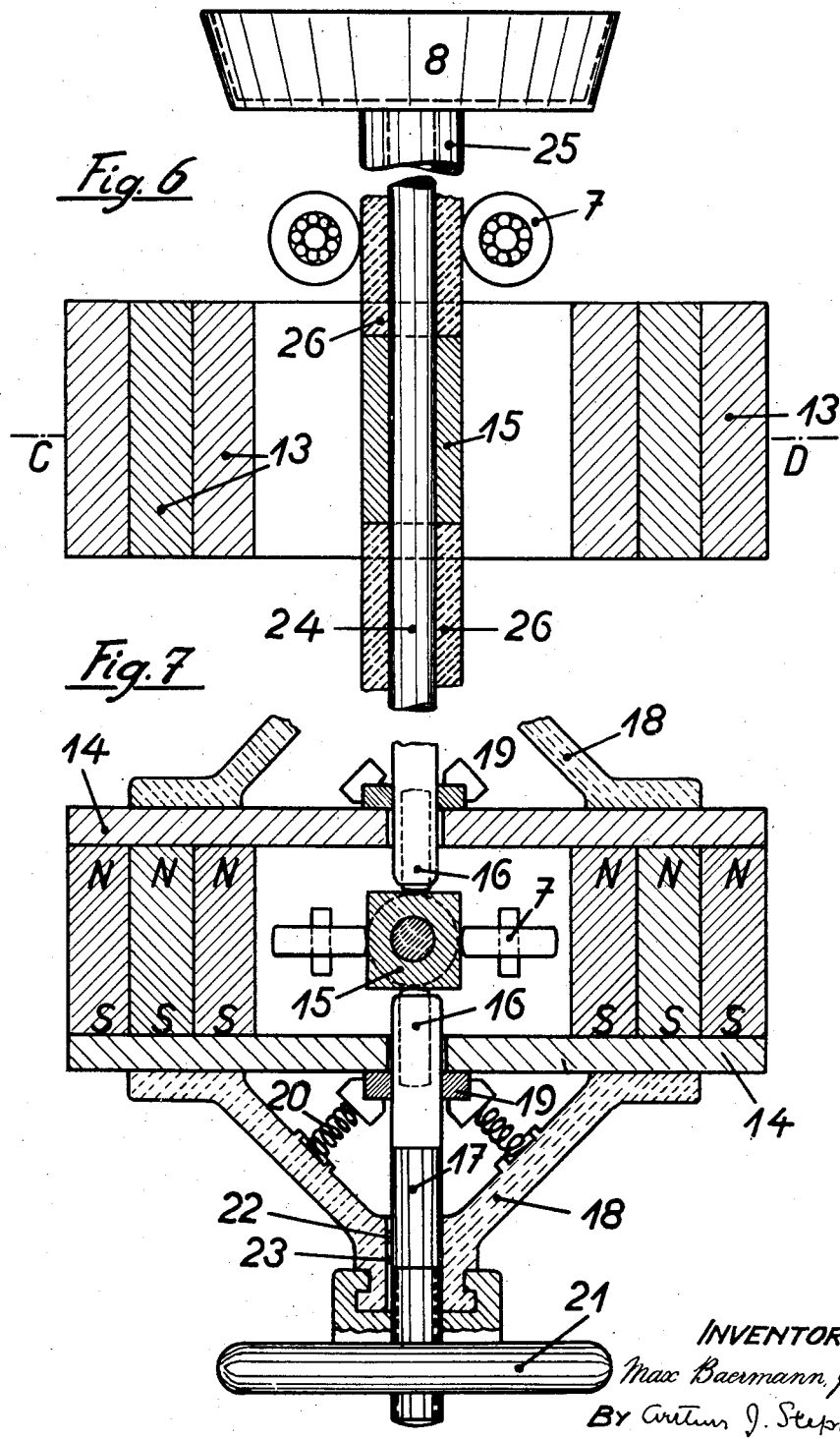

Feb. 28, 1939. M. BAERMANN, JR 2,148,523
APPARATUS FOR WEIGHING
Filed June 5, 1935 4 Sheets-Sheet 3
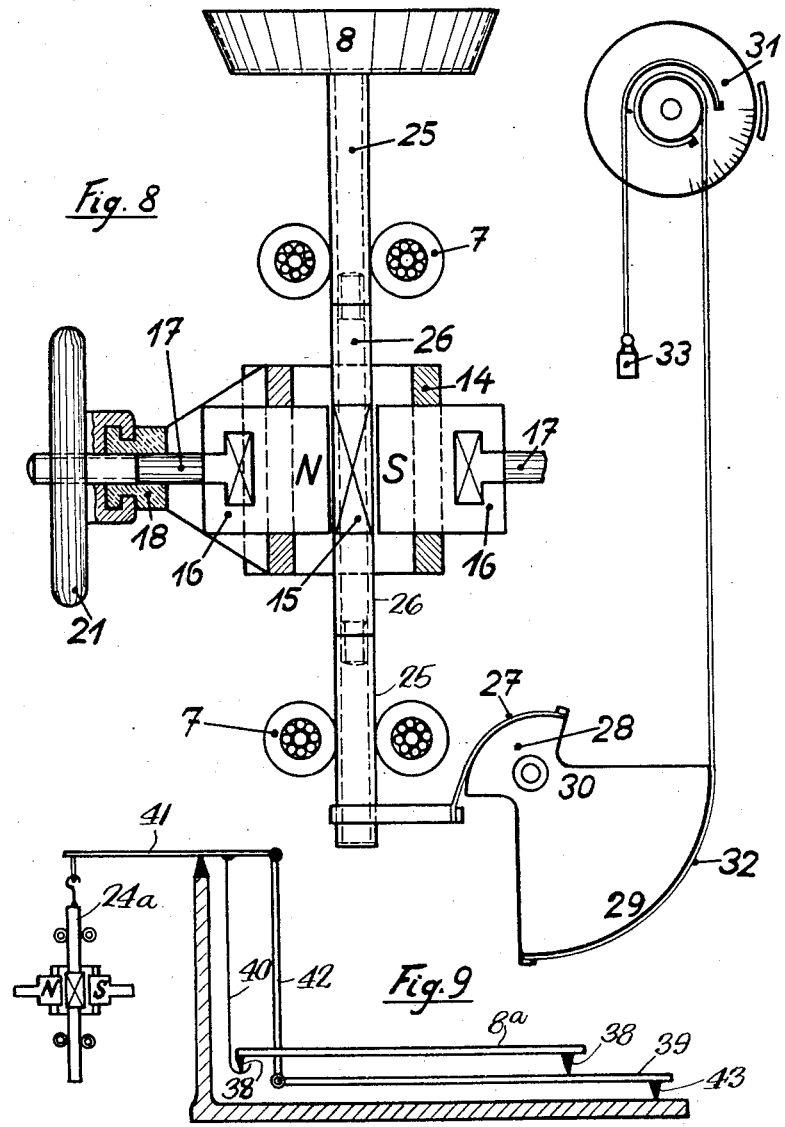
INVENTOR
Max Baermann, Jnr.
BY Arthur J. Stephens
ATTORNEY.

Feb. 28, 1939. M. BAERMANN, JR 2,148,523
APPARATUS FOR WEIGHING
Filed June 5, 1935   4 Sheets-Sheet 4
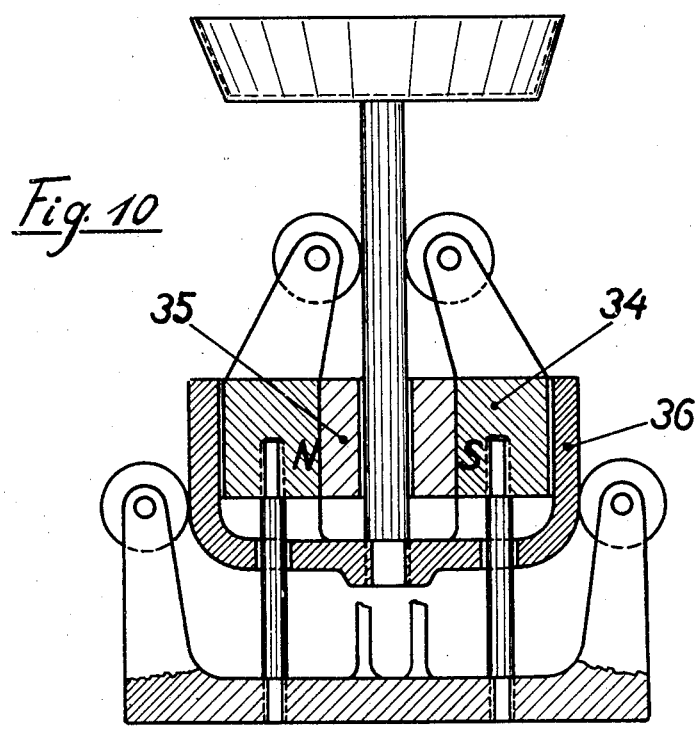
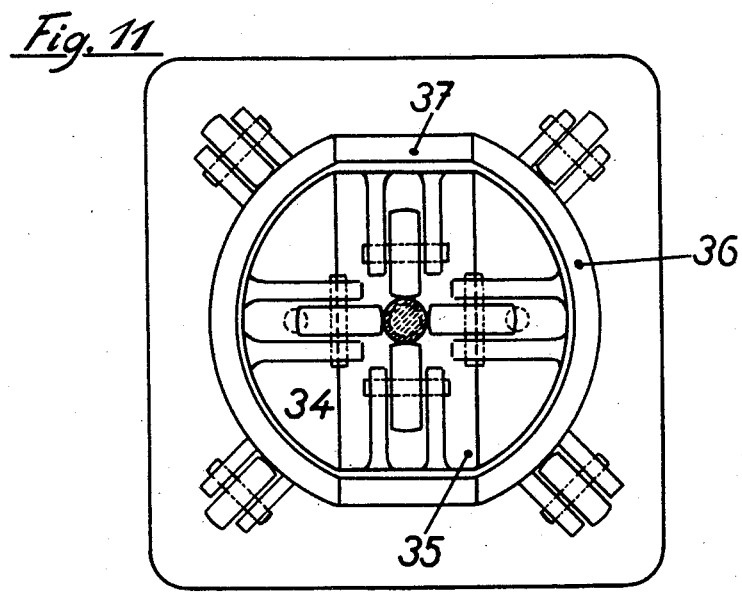
INVENTOR
Max Baermann, Jnr.
BY Arthur J. Stephens
ATTORNEY Patented Feb. 28, 1939

2,148,523

UNITED STATES PATENT OFFICE 2,148,523

APPARATUS FOR WEIGHING

Max Baermann, Jr., Cologne, Germany

Application June 5, 1935, Serial No. 25,108
In Germany June 9, 1934

6 Claims. (Cl. 265—27)

The invention relates to an apparatus for weighing loads of all kinds, the force of a magnetic field being used as a counter-balance for the load to be weighed.

Balances are known in which the counterbalancing is effected not by weights but by an armature which is drawn into a solenoid connected in an electric circuit. The current necessary for this serves as an indication of the load to be weighed. This known device has the fault that a source of electric current is necessary and that the measurement cannot take place directly, but only by its relation to the current. This device is not only complicated and owing to the consumption of current uneconomical, but it involves in addition a number of sources of error, as for example, inconstancy of the supply current, heating of the solenoid during prolonged use as well as bad contacts or even interruptions in supply. In addition there are the disadvantages which are the same with every balance having a weighbeam, knife-edges and pans and of which the most important is the inertia of the whole system.

The disadvantages of the known device are avoided with this invention by an apparatus which is characterised by the force exerted on an armature freely oscillating in a permanent magnetic field serving to counterbalance the load. The armature is of highly permeable ferromagnetic material of which soft iron is typical which cannot be permanently magnetized but is highly conductive to the flux in the air gap of the magnet, and the term "armature" used in this specification and the claims is to be understood as restricted to such material. A separate source of current is unnecessary, so that the sources of error and expense associated therewith are avoided.

The invention is advantageously carried out by the aid of an apparatus in which the armature guided between adjustable rollers by guide bars is the direct carrier of the load. This apparatus forms an important simplification and improvement as compared with the known devices, in so far that the weigh-beam with its great friction and inertia is replaced by an armature of relatively small mass oscillating without friction in the field of a magnet. Since the elastic medium used to counterbalance the load, namely the magnetic field, is without mass, in particular the inertia of the system, since only the mass of the armature and the load come into question, is very much lower than in other weighing apparatus.

While in usual balances, separate damping devices must be provided to brake the oscillation in order to obtain rapid indication of the weight, in the present invention this damping is effected in ideal and lossless manner by the magnetic field and armature themselves, in that the eddy currents occurring in the armature during oscillation oppose continuance of the oscillations. This inherent damping action of the armature can according to the invention be increased by attachment of copper plates, aluminium plates, or the like.

In a further development of the invention a multiple magnet arrangement is used, in which adjustable pole shoes are arranged between the magnets which are coupled with like poles together, the armature being guided to move parallel with the pole shoes oscillating between them. This arrangement makes possible the production of a very strong, approximately homogeneous and stray-less magnetic field over the whole length of the pole shoes and at the same time the exact adjustment of the air-gap between the armature and the pole shoes and therewith also the field strength. In this arrangement, the armature can be given the same height as the pole shoes, so that the stroke available for measurement corresponds to almost the total height of the pole shoes. This considerably increased stroke permits more accurate reading of the weight.

In further development of the idea of the multiple magnet arrangement, according to the invention the magnets are so formed that similar poles surround the opposite similar poles ring fashion, whereby an annular magnetic field is produced in which the armature, correspondingly formed as a hollow body, oscillates. Field and armature can have any desired cross-section. For reasons of simple production a circular cross-section will however be preferred and the armature accordingly has the form of a short tube. The advantage of this arrangement lies in the efficient utilisation of the iron cross-section of the armature which results in a considerable reduction of weight. A further result of this mode of construction is a reduction of the oscillating mass of the balance.

In place of adjusting the pole shoes to regulate the field strength by narrowing or widening the air gap, according to the invention a variable magnetic by-pass can be provided on the magnet arrangement, by the aid of which the field strength in the main field can be influenced. This measure is particularly advantageous in combination with the multiple magnet arrangement in so far as the adjustment of the several pole shoes is avoided.

The reading of the weight can take place by means of a pointer working over a divided scale, which pointer can be actuated directly from the guide rod secured on the armature, by means of a toothed wheel and rack. Since however, the attractive force between the poles and armature follows approximately a quadratic, or at any rate a higher order law, then with direct transmission of the movement of the armature to the pointer, the scale must be divided corresponding with this function of the second or higher degree. As the unequal scale division arising herefrom is not advantageous for practical use, according to the invention the movement of the armature is transmitted to the indicating device by spring bands running over cam discs, the cam discs having such shape as to compensate for the movements of the armature following a higher order law, so that the movements of the indicating device are directly proportionate to the loading, and the scale is consequently uniformly divided.

Instead of effecting the compensation of the non-linear movement by cam discs, this compensation can also advantageously be effected by widening the air-gap between the pole shoes of the magnet of the armature towards the end of the magnet by rounding off the outer edges of the pole shoes or the armature. The result is thereby obtained that the field towards the end of the magnet decreases in strength, so that accordingly the attraction of the armature does not increase by the amount which would be the case with a parallel course of the boundary surfaces of the air-gap.

A further possibility of influencing the force exerted by the magnet on the armature consists according to the invention in the armature being hollowed out in the end turned away from the end of the magnet, say paraboloidally, so that owing to the saturation value of the iron being exceeded at the thinned parts of the armature, the latter undergoes correspondingly reduced attraction with increased downward movement and this in such a way that the resultant force exerted by the magnet on the armature stands in linear relation to the load. In all these cases therefore a uniformly divided weight scale can be used.

In the accompanying drawings, some examples of embodiment of the invention are illustrated.

Figure 1 is a longitudinal section through a balance constructed with the use of a horse-shoe magnet;

Figure 2 is a cross section on the line A—B of Figure 1,

Figures 3 and 4 show arrangements in which the edges of the pole shoes and the armature respectively are rounded off.

Figure 5 shows a magnet arrangement in which the armature is hollowed out.

Figure 6 is a longitudinal section through a balance with a double magnet arrangement.

Figure 7 is a cross section on the line C—D of Figure 6,

Figure 8 is a longitudinal section taken at 90° with respect to Figure 6,

Figure 9 shows the magnetic weighing apparatus in combination with a decimal weight bridge, Figure 10 is a longitudinal section through an embodiment of the magnetic balance with centrally arranged magnet body, and Figure 11 is a plan view of the magnetic balance shown in Figure 10.

As shown in Figures 1 and 2 between the pole shoes 1 of the horse shoe magnet 2 an armature 3 of soft iron is guided by means of the guide rails 4 between the adjustable guide rollers 5 arranged in pairs on opposite sides. The rod 6 secured to the armature 3 and consisting of non-magnetic material such for example as brass, is also held between at least three or four opposite adjustable rollers 7 and carries the pan 8 designed to receive the load. By means of these rollers arranged above and below the magnet, the armature rod can be so directed that the armature is located exactly in the centre between the pole shoes and therefore that the centre line of armature and rod coincides with sufficient accuracy with the magnetic mid axis of the system. In these conditions only an extremely small attractive force is exerted by the pole shoes on the armature, so that in this case the rollers do not have to withstand any lateral force worth mentioning. With complete coincidence of the centre line and magnetic mid axis, theoretically there is no lateral attractive force at all. This ideal condition can be very closely approached by careful adjustment of the rollers. Any force absorbing friction is thereby excluded so that this balance in contradistinction to all known constructions works practically without friction. With loading of the balance, the armature sinks downwards by an amount corresponding with the increasing magnetic attraction; in the extreme case, down to the dotted line position—see Figure 1. This movement of the armature and rod is transmitted by means of the rack 9 mounted on the rod through toothed wheel 10 to the pointer 11, which indicates the weight of the load on the divided scale 12.

In the magnet arrangement shown in Figures 3 and 4 the pole shoes 1ª and the armature 3ª respectively are rounded off to compensate the nonlinear law of motion of the armature. The same result is achieved with the embodiment of the magnet system shown in Figure 5 by the armature 3ᵇ being hollowed out say paraboloidally on the side turned towards the load.

In the embodiment shown in Figures 6–8 the magnet system is put together from several individual magnets 13 and two plates 14 similar poles being assembled together. The armature 15 oscillates in the centre of the system between the adjustable pole shoes 16 projecting through the plates 14. The pole shoes are secured on rods 17 of non-magnetic material, which are adjustably guided in domes or bows 18 mounted on the plates 14. In order to ensure a good magnetic joint between the pole shoes and fastening plates 14, slide pieces 19 are provided at the places of passage of the pole shoes, which are under the pressure of springs 20. The adjustment of the pole shoes takes place by means of hand wheels 21. To prevent rotation the rods 17 have a projection 22 which slides in a groove 23 in the dome 18. The armature rod consists of the actual rod 24 of non-magnetic material on the end of which tubular pieces 25 of hardened steel or some other hard and abrasion resisting material are screwed. In the intermediate space between armature 15 and steel tubes 25, sleeves 26 of non-magnetic material surround the armature rod. The considerable use of non-magnetic materials for all constructional parts lying outside the magnetic field has the purpose of avoiding as far as possible a magnetic by-pass for the spreading lines of the magnetic field, because the weighing results would be affected. In order however to exclude all magnetic stray effects even when iron loads are to be weighed, screening plates of copper, aluminium or other suitable materials for this purpose can advantageously be provided between load and magnet system. The armature rod is guided above and below the magnet system by adjustable rollers 7 supported on bearings, which to reduce wear are arranged at the level of the steel tubes. The upper end of the armature rod carries the pan 8 designed to receive the load. The lower end is connected with a spring band 27 which is laid over the cam disc 28. This cam disc with a second cam disc 29 forms a two armed lever 30, through which the movement of the armature is transmitted from the armature to the indicating drum 31 by means of the further spring band 32. The return rotation of the drum and unloading of the lever are effected by the weight 33.

The new weighing apparatus can be used not only for direct weighing of loads but also, as Figure 9 shows, in combination with a decimal or centesimal weigh-bridge, the range of weight being thereby correspondingly increased.

In Fig. 9, the platform 8a is supported by knife edges 38 on a beam 39 and the lower end of link 40. Link 40 is suspended from one arm of the balance beam 41, together with link 42. The beam 39 is supported at one end by knife edge 43 and at the other end by the lower end of link 42. The other end of the balance beam 41 is connected to a rod 24a of a magnetic balance device similar to that shown in Figs. 6, 7 and 8.

As material for the magnets of the balance, high value magnetic alloys are advantageously used, whose coercivity lies considerably above that of the usual magnets and which in addition have the advantage that they do not age. Particularly the latter property makes the new balance a reliable apparatus for all purposes. But even with the use of customary magnets any aging phenomena occurring in use can be dealt with by adjusting the pole shoes corresponding with the change in coercivity to such an extent that the original field strength is again obtained in the air gap, or by corresponding regulation of an adjustable magnetic by-pass in parallel with the poles. Such an adjustment is illustrated in the example of embodiment according to Figures 6–8. It can be provided with the horse-shoe magnet shown in Figure 1 in such a way that the magnet ends are influenced by adjusting screws.

Figures 10 and 11 show a further embodiment of the magnetic balance in longitudinal section and cross section, the magnet body 35 provided with two semicircular pole shoes 34, being centrally arranged, while the bell or dome shaped armature 36 externally encloses the core with the pole shoes. In addition the freely oscillating armature is guided in similar manner to the other embodiments, between adjustable rollers. As the drawings further show, the armature is provided with two opposite notches 37, which lie in the neutral zone.

It will be noted that in all of the hereinbefore described form of the invention all parts, if any, extending from the armature in the trailing direction or rearwardly therefrom when displaced by a load, are of non-magnetic material.

What I claim is:—

1. In apparatus for weighing loads, the combination of a pair of parallel permanent bar magnets spaced apart, a pair of soft iron plates respectively bridging the poles of the same sign of said magnets, a pair of pole pieces respectively traversing and making a magnetic joint with said plates and projecting into the space enclosed by the magnets and plates, an armature within the air gap between said pole pieces, means guiding said armature to move transversely of the flux in said air gap, means for applying the load to be weighed to said armature and means indicating the deflection of said armature under load.

2. In apparatus for weighing loads as set forth in claim 1 screw means for moving the pole pieces to adjust the air gap, slide pieces of magnetic material abutting said pole pieces and iron plates to form a magnetic joint, and spring means urging said slide pieces against said pole pieces and plates.

3. Apparatus for weighing loads as set forth in claim 1, wherein the armature is of tubular form and the guiding means comprise a rod of non-magnetic material traversing the armature, non-magnetic spacers on said rod at each end of the armature, hardened members on said rod beyond said spacers, and rollers contacting with said hardened members.

4. In apparatus for weighing loads, the combination of a permanent magnet having oppositely positioned pole pieces with an air gap therebetween, a highly permeable soft iron armature positioned in said air gap out of contact with said pole pieces for concentrating and conducting the magnetic flux flowing between said pole pieces across said air gap, guiding means supporting said armature for movement in a direction solely transversely to the direction of magnetic flux across the air gap, means for applying a load to said armature to displace it from a position within the space between said pole pieces, in which it is supported by the concentrated magnetic flux, in a direction transverse to the direction of the magnetic flux, to a position partially out of the space directly between the pole pieces, the soft iron armature being of a size such that its trailing edge, when displaced by a load, lies within the upper and lower limits of the pole pieces, and any and all parts extending from said armature in the trailing direction being of non-magnetic material, whereby weighing can be effected with the original constant magnetic flux of the permanent magnet and the magnetic flux will still be concentrated in said armature and conducted thereby between the pole pieces, and means for indicating the amount of said displacement.

5. In apparatus for weighing loads, the combination of a permanent magnet having oppositely positioned pole pieces with a horizontally disposed air gap therebetween, a highly permeable soft iron armature positioned in said air gap out of contact with said pole pieces for concentrating and conducting the magnetic flux flowing between said pole pieces across said air gap, guiding means supporting said armature for movement in a direction solely transversely to the direction of magnetic flux across the air gap, means rigid with said armature for applying a load to said armature to displace it from a position within the space between said pole pieces, in which it is supported by the concentrated magnetic flux, in a direction transverse to the direction of the magnetic flux, to a position partially out of the space directly between the pole pieces, the soft iron armature being of a size such that its trailing edge, when displaced by a load, lies within the upper and lower limits of the pole pieces, and any and all parts extending from said armature in the trailing direction being of non-magnetic material, whereby weighing can be effected with the original constant magnetic flux of the permanent magnet and the magnetic flux will still be concentrated in said armature and conducted thereby between the pole pieces, and means for indicating the amount of said displacement.

6. In apparatus for weighing loads, the combination of a permanent magnet having oppositely positioned pole pieces with a horizontally disposed air gap therebetween; a highly permeable soft iron armature positioned in said air gap out of contact with said pole pieces for concentrating and conducting the magnetic flux horizontally across said air gap, a rod of non-magnetic material rigidly supporting said armature, rollers set to guide the assembly of said armature and rod in a fixed vertical direction with the armature centralized in said air gap, means fast on said rod rigid with said armature for applying a load to said armature to displace it from a position within the space between said pole pieces, in which it is supported by the concentrated magnetic flux, in a direction transverse to the direction of the magnetic flux, to a position partially out of the space directly between the pole pieces, the soft iron armature being of a size such that its trailing edge, when displaced by a load, lies within the upper and lower limits of the pole pieces, and any and all parts extending from said armature in the trailing direction being of non-magnetic material, whereby weighing can be effected with the original constant magnetic flux of the permanent magnet and the magnetic flux will still be concentrated in said armature and conducted thereby between the pole pieces, and means for indicating the amount of said displacement.

MAX BAERMANN, JR.